United States Patent

[11] 3,572,663

[72] Inventor  Cornelis Van Der Lely
              7 Bruschenrain, Zug, Switzerland
[21] Appl. No. 711,450
[22] Filed     Mar. 7, 1968
[45] Patented  Mar. 30, 1971
[32] Priority  Mar. 17, 1967
[33]           Netherlands
[31]           6,704,006

[54] CROP DRIERS
     15 Claims, 17 Drawing Figs.
[52] U.S. Cl. .................................................... 263/21,
                                                34/216, 263/25
[51] Int. Cl. ..................................................... F27b 3/00
[50] Field of Search .......................................... 56/(Cursory); 107/(Cursory); 263/25, 21; 34/201, 203, 207, 216, 217

[56]              References Cited
              UNITED STATES PATENTS
     2,334,949  11/1943  O'Neal et al. ................. 263/21
     2,458,617  1/1949   McConnaughay ........... 34/216
     2,513,480  7/1950   Heth ............................. 263/40
              FOREIGN PATENTS
       312,077  5/1919   Germany ...................... 263/21

Primary Examiner—John J. Camby
Attorney—Mason, Mason and Albright

ABSTRACT: A mobile crop drier wherein cut crop is gathered, crushed and conveyed obliquely into a large housing wherein a stream of air is introduced which is mixed with and heated by combustion products from a burner, the mixture of hot, gaseous material impinging on the conveyed crop in the forward upper interior of the housing and thereafter carrying it through a serpentine path in the housing for final discharge through the lower rear part of such housing. A series of rotating ejectors continuously underlie said path and toss the heavier, more moist crop back into the stream of hot, gaseous material at a selected angle which may be manually or automatically controlled responsive to the temperature of the stream at the particular location in the path. Also, the speed and direction of rotation of the ejectors are controllable. A cab may be mounted in the front of the housing and the operative speed of the drier may be automatically adjusted to accommodate the quantity of cut crop gathered by the drier. Controls and temperature indicators are within manual and visual range of the operator. A mobile wafer press combined with a receptacle is advantageously connected to the housing to receive and press wafers from the warm dried crop discharged from the housing, said wafer press including a receptacle to store wafers therefrom. The receptacle has a discharge conveyor for discharge of wafers therefrom. The dried crop is first pressed in a compression chamber in the wafer press which is as wide as the swath of crop lying on the ground and knives thereafter cut such initial compressed crop into wafers which have approximately square cross sections.

Patented March 30, 1971

INVENTOR
CORNELIS VAN DER LELY
BY
Mason, Mason & Albright
Attorneys

Patented March 30, 1971
3,572,663
10 Sheets-Sheet 5
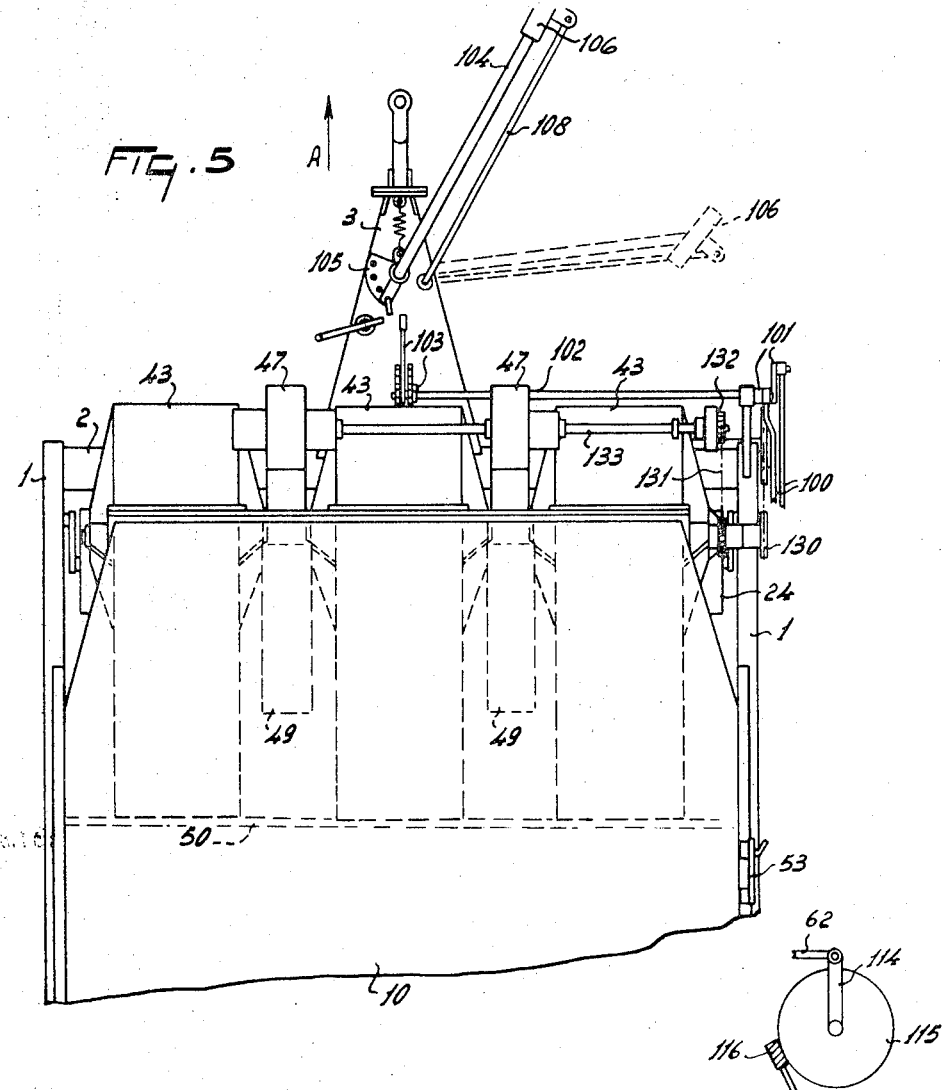
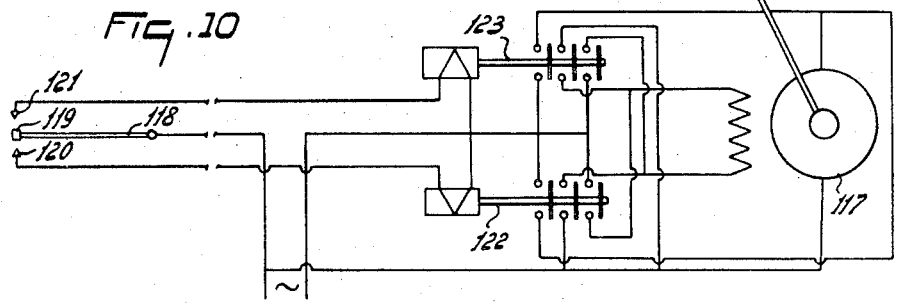
INVENTOR
CORNELIS VAN DER LELY
BY
Mason, Mason & Albright
Attorneys Patented March 30, 1971 3,572,663

INVENTOR
CORNELIS VAN DER LELY
BY
Mason, Mason & Albright
Attorneys

Patented March 30, 1971 3,572,663

INVENTOR
CORNELIS VAN DER LELY
BY
Mason, Mason & Albright
Attorneys

Patented March 30, 1971

INVENTOR
CORNELIS VAN DER LELY
BY
Mason, Mason & Albright
Attorneys

CROP DRIERS

This invention relates to crop driers.

According to a first aspect of the present invention there is provided a crop drier comprising ventilator means for displacing air in one or more crop drying spaces and ejecting members for throwing up crop in a direction which is at an angle to the direction in which air is displaced in said drying space or spaces by said ventilator means.

According to a second aspect of the present invention there is provided a crop drier comprising a superstructure in which crop is dried during operation of the drier, and one or more rows of ejecting members arranged one above the other and along which air is passed during operation.

According to a third aspect of the present invention there is provided a crop drier comprising a superstructure in which crop is dried during operation of the drier, and an ejecting member for tossing crop, and, near the ejecting member, crop guide members adjustable into various positions for altering the direction in which the crop is displaced by the ejecting member.

According to a fourth aspect of the present invention there is provided a crop drier comprising a superstructure in which crop is dried in operation of the drier, the superstructure accommodating an ejecting member for displacing crop, which member is adapted to be driven in two opposite directions.

According to a fifth aspect of the present invention there is provided a crop drier for stem crop or leaf crop or both comprising a superstructure in which the crop is dried in operation of the drier, the superstructure comprising an ejecting member provided with flexible tines.

BRIEF DESCRIPTION OF THE DRAWINGS

For a better understanding of the invention and to show how the same may be carried into effect, reference will now be made, by way of example, to the accompanying drawings, in which:

FIG. 5 is a plan view, on an enlarged scale, of the front part of the drier of FIGS. 1 and 2, FIG. 6 and 7 show diagrammatically measuring instruments provided for measuring the temperature inside the drier of FIGS. 1 to 5, FIG. 10 shows schematically a mechanism provided in the drier of FIGS. 1 to 5 for the adjustment of guide blades of the drier.

DESCRIPTION OF THE PREFERRED EMBODIMENTS

Figure 1:
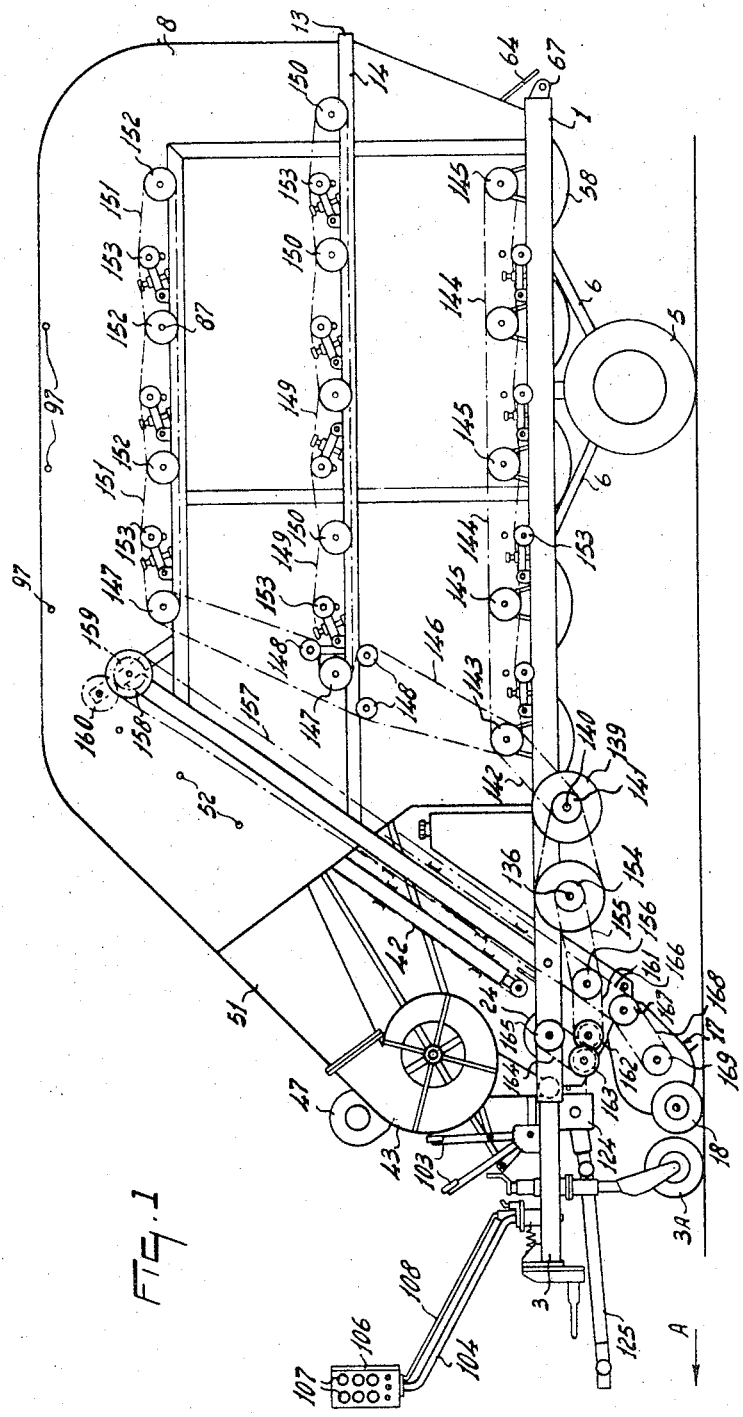
FIG. 1 is a diagrammatic side view of a transportable crop drier.
Figure 2:
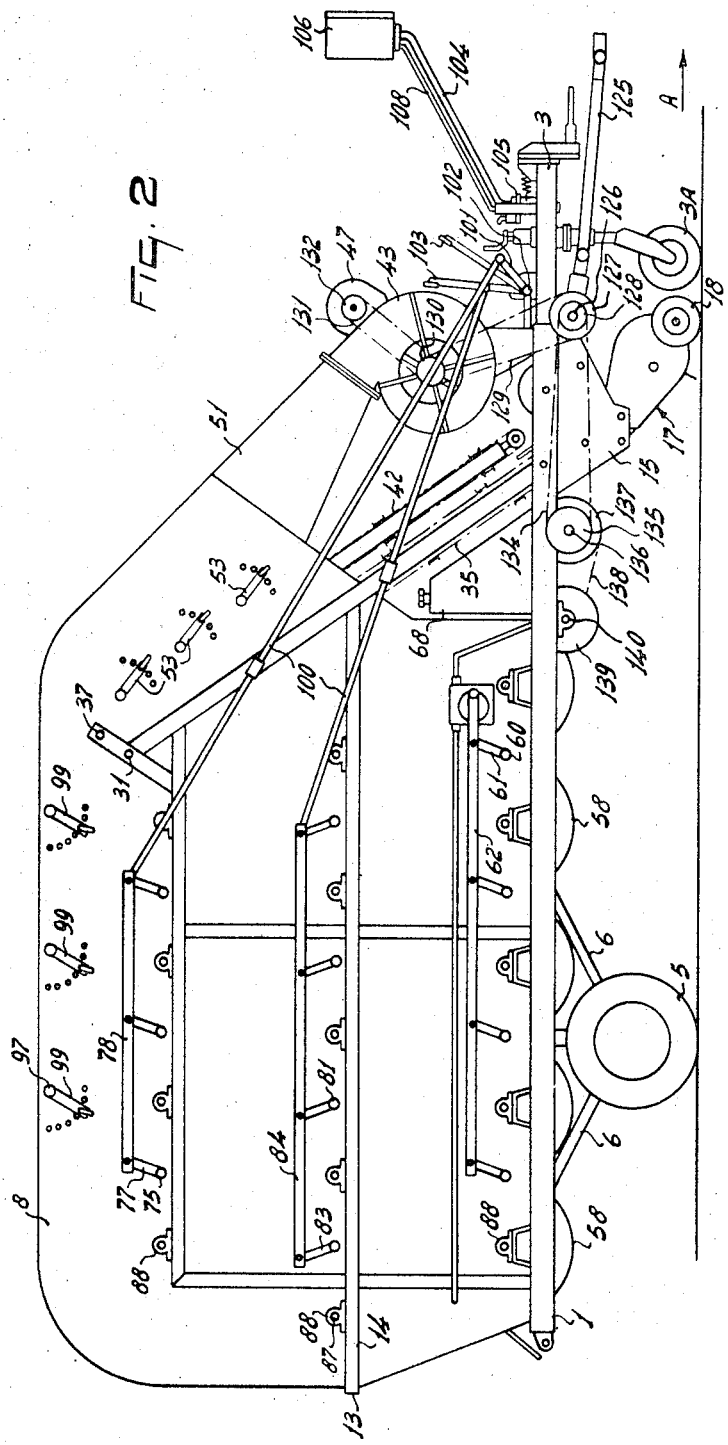
FIG. 2 is a diagrammatic view of the other side of the drier of FIG. 1.
Figure 3:
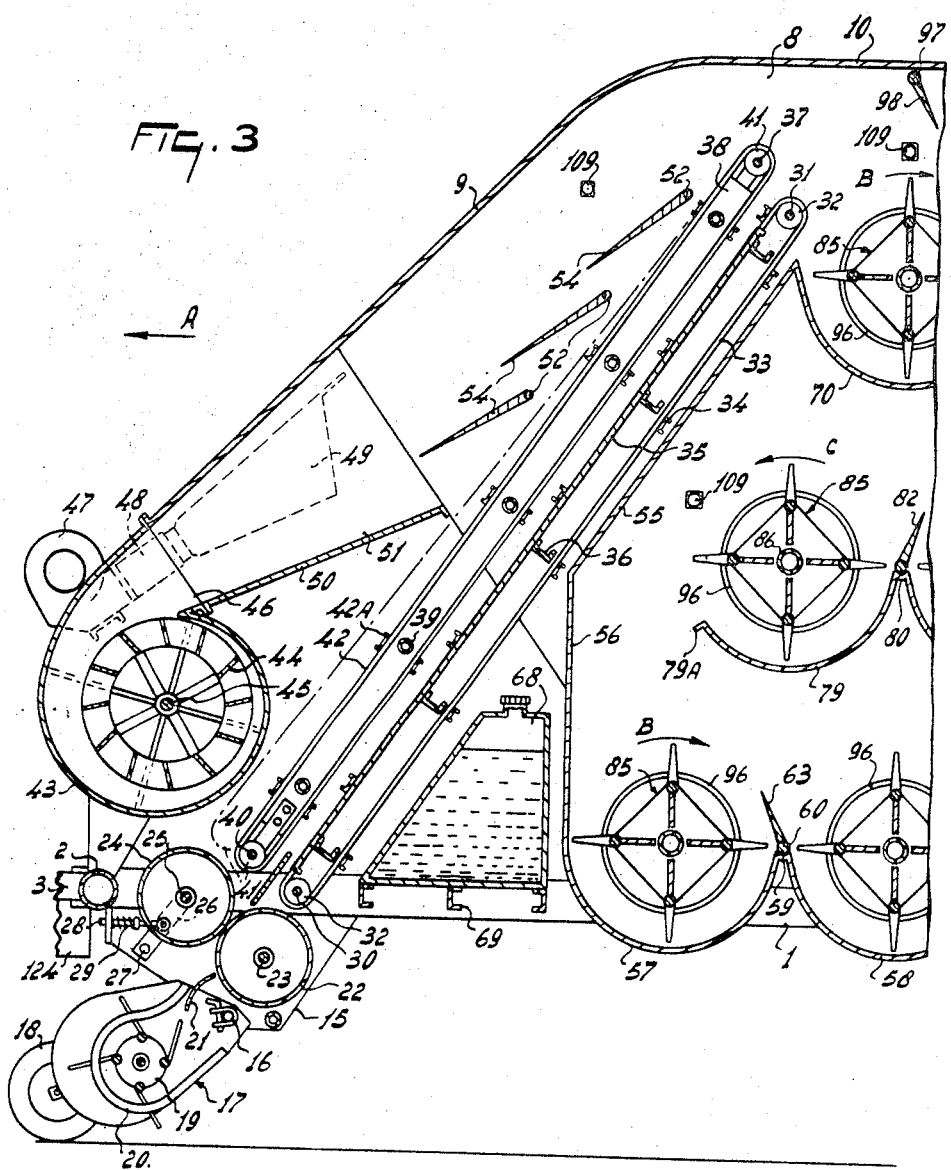
FIG. 3 is a sectional side view, on an enlarged scale and taken from the same viewpoint as FIG. 1, of the front part of the drier of FIGS. 1 and 2.
Figure 4:
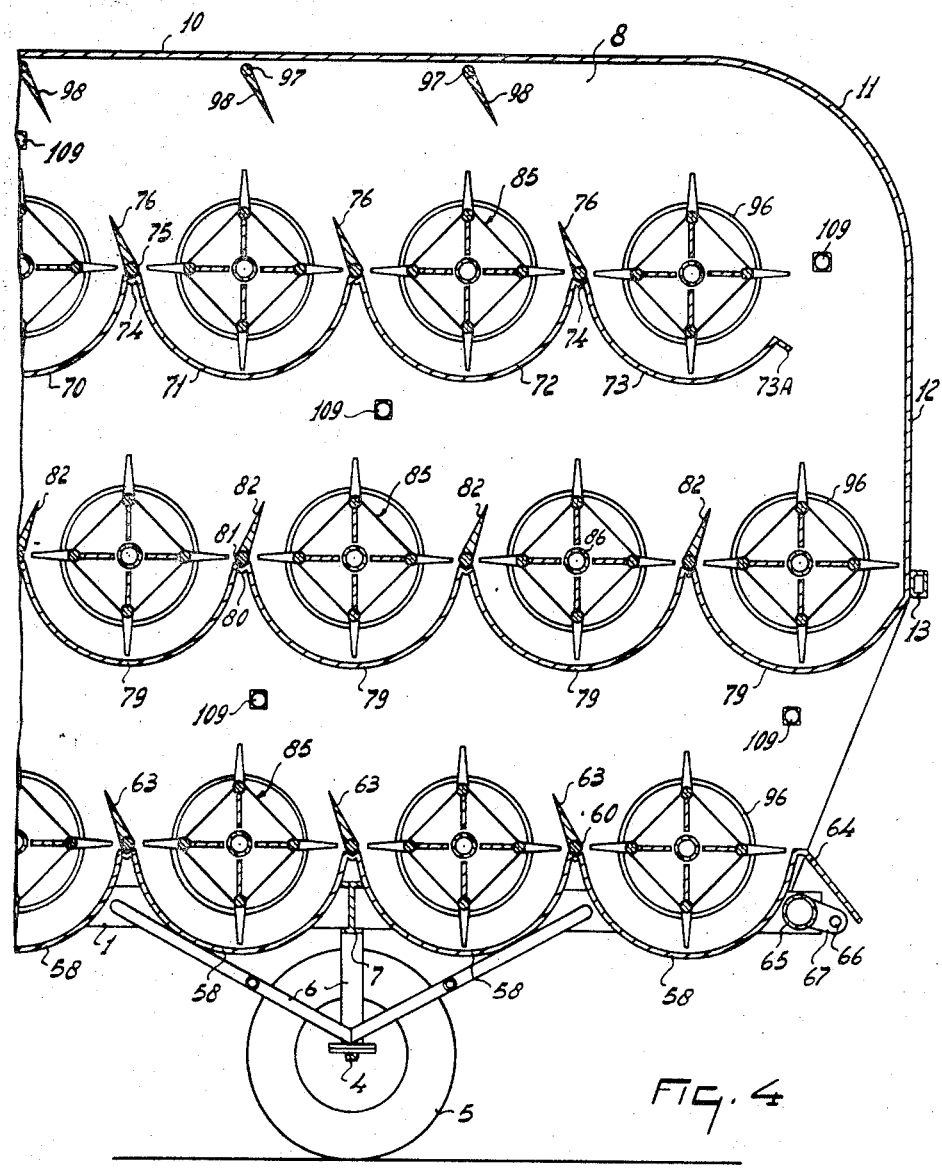
FIG. 4 is a sectional side view, on an enlarged scale and taken from the same viewpoint as FIG. 1, of the rear part of the drier of FIGS. 1 and 2.

The crop drier shown in FIGS. 1 to 5 is in the form of a towable wagon having a frame that includes two longitudinal frame beams 1 interconnected by transverse beams. To the foremost transverse beam 2 (FIG. 5) is secured a drawbar 3. The frame is supported at the rear from ground wheels 5 coupled with an axle 4 (FIG. 4). The axle 4 is connected by beams 6 with the frame beams 1 and with a transverse beam 7 located between the frame beams 1. The drawbar 3 is provided with a vertically adjustable supporting wheel 3A that serves to support the front of the drier when it is not hitched to a towing vehicle.

The superstructure of the wagon is formed by two sheet metal sidewalls 8 interconnected by a sheet metal, closed, front wall 9 (FIG. 3), which extends from the front of the wagon at an angle of 45° obliquely upwards to the rear, terminating in a horizontal upper wall 10. The upper wall 10 joins, through a curved portion 11, a vertical rear wall 12 (FIG. 4) which extends downwards slightly beyond half the height of the superstructure. The lower end of the portion 12 is reinforced by means of a transverse beam 13 which is integral with beams 14 extending along the sidewalls 8.

Behind the transverse beam 2 downwardly projecting plates 15 (FIG. 3) are fastened to the frame beams 1. By means of stub shafts 16 extending transversely of the longitudinal direction of the wagon a pickup member 17 is coupled with the plates 15 and s supported from ground wheels 18. The pickup member 17 consists of a drum 19 provided with resilient tines that move between U-shaped scrapers 20. The upper ends of the scrapers 20 are located above a plate 21 extending between the plates 15 and having an upper rim extending along the periphery of a crushing roller 22 disposed between the plates 15. The crushing roller 22 is secured to a shaft 23 journaled in bearings secured to the plates 15. The crushing roller 22 cooperates with a second crushing roller 24 which is secured to a shaft 25. The shaft 25 is journaled in bearings secured to arms 26 which are coupled, by means of stub shafts 27 extending parallel to the shaft 25, with the plates 15. With the arms 26 are coupled coupling rods 28 which are surrounded, over part of their lengths, each by a compression spring 29 so that the crushing roller 24 is urged against the crushing roller 22.

Above the crushing roller 22, bearings secured to the frame beams 1 accommodate a shaft 30 which extends parallel to the shaft 23. Bearings secured to the sidewalls 8 and spaced below the upper wall 10 hold a shaft 31 extending parallel to the shaft 30. The shafts 30 and 31 are provided with chain sprockets 32 around which endless chains 33 are passed. The chains 33 have catches in the form of U-shaped beams 34 secured to them. The chains 33 with the catches 34 constitute a conveyor which extends obliquely upwards and rearwards at an angle of 35° to the frame beams 1. The upper run of this conveyor moves over a sheet metal plate 35 extending parallel to the upper run. The plate 35 is supported from U-shaped beams 36 extending between the sidewalls 8.

Spaced above and slightly in front of the shaft 31 is a shaft 37 that extends parallel to the shaft 31 and is journaled in bearings secured to the sidewalls 8. Downwardly projecting beams 38 are freely rotatable about the ends of the shaft 37 located near the sidewalls 8. The beams 38 are interconnected by transverse beams 39. Bearings secured to the lower ends of the beams 38 hold a shaft 40 extending parallel to the shaft 37. The shafts 37 and 40 are provided with chain sprockets 41 around which endless chains 42 are passed. The chains 42 are provided with catches formed by U-shaped beams 42A extending parallel to the shafts 37 and 40. The conveyor formed by the chains 42 and the catches 42A is able to rotate about the shaft 37 from the position shown in FIG. 3 in full lines into the position shown in FIG. 3 by dot-dash lines. Stops (not shown) limit the amount that the conveyor 42/42A can rotate with respect to the conveyor 33/34, which latter conveyor is fixed with respect to the frame of the drier, so that the catches and the chains or both of the two conveyors cannot come into contact with each other.

Near the front of the wagon, above the frame beam 2, three ventilator housings 43 are disposed side by side. The ventilator housings 43 contain impellers 44 (FIG. 3) which are secured to a shaft 45 extending transversely of the direction of travel. The outlet ports 46 of the ventilator housings 43 are disposed in such positions that the air propelled by the ventilators passes upwards along the front wall 9. Between the ventilator housings 43 there are two ventilators 47 whose outlet spouts 48 contain burners (not shown). The outlet spouts 48 communicate with combustion chambers 49. The space between the front wall 9 and the foremost conveyor 42/42A accommodates a partition 50 for guiding the air propelled by the ventilators 43. The partition 50 extends between the rear edges of the two plates 51 which are secured to the sides of the lower part of the wall 9, the plates 51 being approximately in line with the sidewalls 8.

Near the upper portion of the conveyor 42/42A, bearings secured to the sidewalls 8 accommodate three horizontal shafts 52 (FIG. 3) extending transversely of the longitudinal direction of the wagon and adapted to be adjusted to different positions by means of arms 53 (FIG. 2) located outside the wagon. The shafts 52 are located on a line parallel to the plate 35 and are provided with guide blades 54 extending between the sidewalls 8.

Between the sidewalls 8 and parallel to the plate 35, a plate 55 is disposed at such a distance from the plate 35 that a part of the lower run of the conveyor 33/34, located between the plates 35 and 55, moves directly along the plate 55. The plate 55 extends from a point approximately directly below the shaft 31 obliquely to the front in downward direction as far a location disposed slightly beyond half the height of the superstructure. From this location the plate 55 terminates in a vertical plate 56 extending between the sidewalls 8 and joining, at a comparatively short distance above the frame beams 1, a plate 57 extending between the walls and having a semicircular configuration as viewed from the side of the drier (FIG. 3). The curved plate 57 together with four plates 58, located behind the curved plate 57 and extending between the sidewalls 8 and also having a semicircular configuration similar to that of the plate 57, and angle-section irons 59 interconnecting the upper edges of the plates 57 and 58 form the floor of the superstructure of the drier.

Between the upwardly extending limbs of the angle-section irons 59, shafts 60 are journaled in bearings secured to the sidewalls 8. Ends of the shafts 60 that project from the superstructure at one side (FIG. 2) are provided with arms 61 which are intercoupled by means of a track rod 62. Guide blades 63 are secured to the shafts 60 so as to extend between the sidewalls 8. As shown diagrammatically in FIG. 10, the forward end of the track rod 62 is hinged to an arm 114 which is secured to a worm wheel 115. The worm wheel 115 is driven by means of a worm 116 by an electric motor 117. At a suitable area in the superstructure of the wagon a measuring instrument responding to the temperature prevailing in the superstructure is provided. This measuring instrument has a moving contact 119 secured to a bimetallic plate 118, and two fixed contacts 120 and 121 with which the contact 119 cooperates. When the contacts 119 and 120 come into contact with each other a switch 122 coupled with the motor 117 is closed to cause the motor to rotate in one direction, whereas in the event of a connection between the contacts 119 and 121 a switch 123, coupled with the motor 117, is closed to cause the motor to rotate in the reverse direction.

The rear edge of the rearmost curved plate 58 is provided with a plate 64 (FIG. 4) extending obliquely to the rear in downward direction throughout the width of the wagon. The plate 64 screens a transverse beam 65 located beneath the plate 64 and interconnecting the frame beams 1 and an ear 67 that is secured to the transverse beam 65. The ear 67 is provided with a hole 66.

In a space between the lower portion of the conveyor 33/34 and the plate 56 a fuel supply tank 68 (FIG. 3) is supported by transverse beams 69 interconnecting the frame beams 1.

The upper end of the plate 55 (FIG. 3) is joined by a plate 70 extending between the sidewalls 8 and having a semicircular configuration as viewed from the side. The sidewalls 8 are furthermore connected by means of plates 71, 72 and 73, located at the same height as the plate 70 in a row behind the plate 70. The plates 71 and 72 have a semicircular configuration similar to that of the plate 70. The plates 70, 71, 72 and 73 are interconnected with the aid of angle-section irons 74 extending between the sidewalls. The rearmost plate 73 extends from the angle-section iron 74 over an arc of a circle of about 145° (FIG. 4). The free edge 73A of the plate 73 is bent over in downward direction through an angle of 90°.

Between the obliquely ascending limbs of the angle-section irons 74, horizontal shafts 75 extend transversely of the longitudinal direction of the wagon and are journaled in bearings secured to the sidewalls 8. The shafts 75 are provided with guide blades 76 extending between the sidewalls. Ends of the shafts 75 that project from the superstructure at one side (FIG. 2) are provided with arms 77 which are interconnected by a track rod 78.

Between the lower wall formed by the plates 57 and 58 and the wall formed by the plates 70, 71 and 72 and 73, a further wall is formed in a similar manner by a plurality of curved plates 79 and interconnecting angle-section irons 80. As shown in FIGS. 3 and 4 the three central plates 79 have a semicircular configuration as viewed from the side, whereas the rearmost plate 79 extends over a slightly smaller circumferential angle and joins the lower edge of the rear wall 12. The foremost plate 79 extends from its fastening point on its associated angle-section iron 80 over a circumferential angle of about 145° to the front. The front edge 79A of this plate 79 is bent over downwardly through an angle of 90°.

Between the ascending limbs of the angle-section irons 80, shafts 81 extend parallel to the shafts 60 and 75 and are supported in bearings secured to the sidewalls 8. The shafts 81 are provided with guide blades 82. Ends of the shafts 81 that project from the superstructure at one side (FIG. 2) are provided with arms 83 which are interconnected by a track rod 84.

Figure 8:
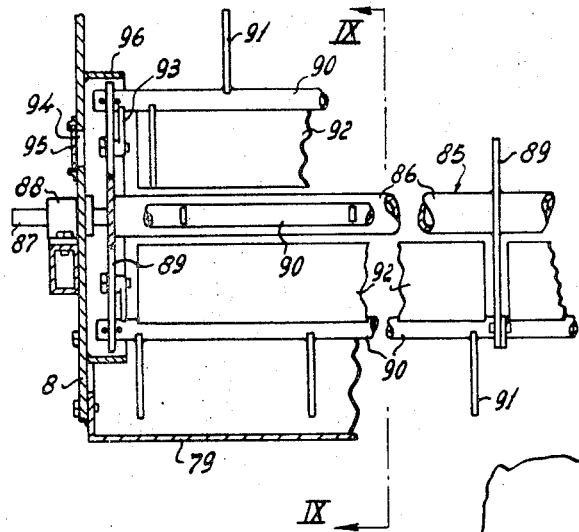
FIG. 8 is a cross-sectional view, on an enlarged scale of a detail of the drier of FIGS. 1 to 5, showing a first form of ejecting member of the drier of FIGS. 1 to 5.
Figure 9:
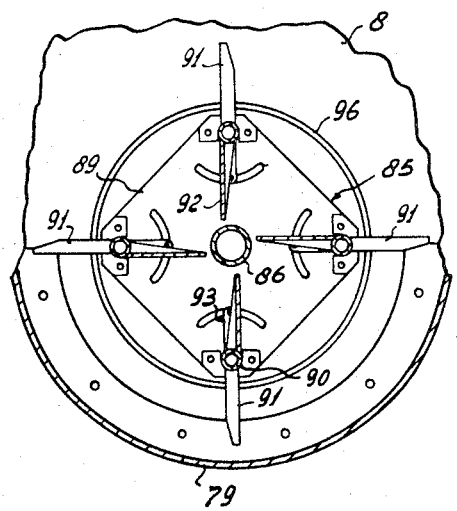
FIG. 9 is a sectional view, taken on the line IX–IX of FIG. 8, showing the ejecting member.

Above each of the plates 57, 58, 70, 71, 72, 73 and 79 there is an ejecting member 85. Each of these ejecting members 85 is formed by a drum that can rotate about a horizontal axis extending transversely of the direction of operative travel of the wagon. The rotary axis of each drum coincides with the axis of symmetry of the curbed portion if the plate 57, 58, 70, 71, 72, 73 or 79 with which the drum is associated. The construction of the drums is shown in detail in FIGS. 8 and 9. Each drum has a central beam 86 to the ends of which stub shafts 87 are secured. The stub shafts 87 are journaled in bearings 88 secured to the sidewalls 8. The beam 86 is provided with plates 89 extending at right angles to the beam. Supports 90, extending parallel to the beams 86, are journaled in the plates 89. Flat, rigid tines 91 are secured to the supports 90 so as to extend to the outside of the drum from the supports 90. Diametrically opposite the times 91 the supports 90 are provided with blades 92 which are formed by plates extending in the longitudinal direction of the drum. The supports 90 are furthermore provided with arms 93 by means of which the supports can be fixed in various positions against rotation with respect to the plates 89. In order to allow an adjustment of the supports 90, the sidewalls 8 are provided with openings 94 which may be shut by means of lids 95. Each end of each drum is surrounded by a ring 96 secured to the adjacent sidewall 8.

Perpendicularly above the rotary axes of the three foremost ejecting members 85 of the upper row of ejecting members, bearings secured to the sidewalls hold shafts 97 extending parallel to said rotary axes. The shafts 97, which are located just beneath the upper wall 10, are provided with downwardly extending guide blades 98 which extend throughout the width of the superstructure. Ends of the shafts 97 projecting from the superstructure at one side (FIG. 2) are provided with arms 99 by means of which the shafts 97 can be turned and be fixed each in any one of a plurality of positions.

Coupling rods 100 (FIG. 2) are pivotably coupled to the front ends of the track rods 78 and 84. The front ends of the coupling rods 100 are secured to arms 101 which are coupled, by means of horizontal shafts 102 extending transversely of the wagon, with levers 103 on the drawbar 3.

Figure 6:
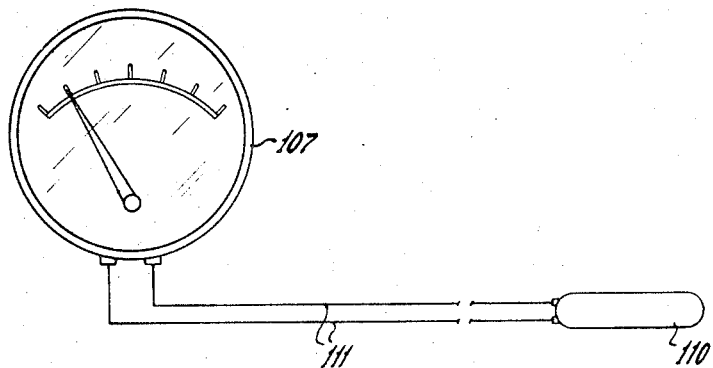
Figure 7:
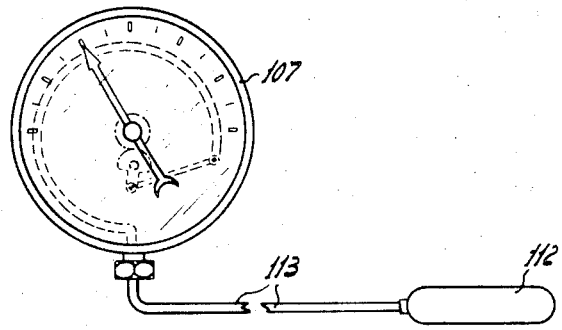

By means of a vertical shaft an obliquely ascending beam 104 is pivoted to the drawbar 3. The beam 104 can be fixed against rotation in various positions by means of a locking member 105. The upper end of the beam 104 is provided with a meter box 106 that is able to turn about a vertical shaft with respect to the beam 104. The meter box accommodates a plurality of temperature measuring instruments 107 FIGS. 1, 6 and 7). The meter box 106 has furthermore pivoted to it the end of a coupling rod 108 the other end of which is pivoted to the drawbar 3. At various places the superstructure of the wagon accommodates temperature measuring instruments 109, which instruments are coupled with the temperature measuring instruments 107 in the box 106. Such a measuring instrument may be formed by a thermocouple 110 which is linked by wires 111 to a thermometer 107 (FIG. 6). A further possibility is shown in FIG. 7, where the measuring instrument is formed by a metal sleeve 112 which is connected by a duct 113 with a manometer serving as a thermometer 107 and calibrated in degrees centigrade. The sleeve 112 and the duct 113 are filled with a gas.

For driving the various component parts shown only schematically in the FIGS. a gear box 124 (FIG. 1) is secured to the lower side of the drawbar 3. The gear box 124 may be coupled via an auxiliary shaft 125 with a driving mechanism for example the power takeoff shaft of a towing vehicle. A shaft 126 (FIG. 2), coupled with the gearwheel transmission of the gearbox 124 and extending transversely of the longitudinal direction of the wagon, is provided at its free end with chain sprockets 127 and 128. The chain sprocket 127 is linked by a chain 129 to a double chain sprocket 130 on the shaft 45 of the impellers 44. The double chain sprocket 130 is further linked, by a chain 131, to a chain sprocket 132 which is coupled, through a gear wheel transmission in the hub of the sprocket 132, with a shaft 133 (FIG. 5) to which the impellers of the ventilators 47 are secured.

The chain sprocket 128 is linked by a chain 134 to a chain sprocket 135 secured to a shaft 136 extending parallel to the shaft 126. The shaft 136 is provided with a pulley 137 which is made up of two frustoconical portions able to slide relative to each other in the longitudinal direction of the shaft 136. The pulley 137 is linked by a belt 138 to a pulley 139 on a shaft 140. The pulley 139 is also made up of two frustoconical portions which are able to slide relatively to each other in the longitudinal direction of the shaft 140. Consequently, between the shafts 136 and 140 a continuously variable transmission ratio for the drive transmitted can be obtained. The adjustment of the pulley portions relative to each other may be carried out in known manner by means of a control member (not shown), which is preferably arranged at the front end of the drawbar 3 or which is secured to the arm 104 near the meter box.

The shaft 140 is made up of two aligned portions, which are coupled with each other, in a manner not shown, by means of a gearwheel mechanism so that although the direction of rotation of the portion of the shaft 140 to which the pulley 139 is secured remains the same, the other portion of the shaft 140, to which a sprocket 141 (FIG. 1) is secured can be driven in the opposite direction. The control member (not shown) for switching over this gearwheel mechanism is preferably arranged near the front end of the drawbar 3. The chain sprocket 141 is linked by a chain 142 to a double chain sprocket 143 on a stub shaft 87 of the foremost ejecting member 85 of the lowermost row of ejecting members 85. The ejecting members 85 of the lowermost row are linked to each other by means of chains 144 passed around sprockets 145 which are secured to the stub shafts 87 of the ejecting members 85 located behind the foremost member 85.

The double chain sprocket 143 is furthermore linked by means of a chain 146 to double chain sprockets 147 on the stub shafts 87 of the foremost ejecting members 85 of the central row and of the upper row. Guide wheels 148 are provided for the chain 146. The double chain sprocket 147 secured to the stub shaft 87 of the foremost ejecting member 85 of the central row is linked through chains 149 and double chain sprockets 150 on the stub shafts 87 of the other ejecting members 85 of the central row to these other ejecting members. In a similar manner the ejecting members 85 of the upper row are linked by chains 151 and double chain sprockets 152 to each other. It is to be noted that the links between the various ejecting members 85 is such that the ejecting members 85 of the central row rotate in a direction opposite that of the ejecting members 85 of the upper row and of the lower row when they are driven. The chains 144, 149 and 151 are tensioned by means of tensioning members 153.

The shaft 136 has, in addition to the pulley 137, a chain sprocket 154 (FIG. 1) which is linked by means of a chain 155 to a sprocket 156 on one end of the shaft 23 of the crushing roller 22. The sprocket 156 is linked by a chain 157 to a sprocket 158 secured to the upper shaft 31 of the conveyor 33/34. The shaft 31 has furthermore a gearwheel 159 the teeth of which engage a gearwheel 160 secured to the shaft 37 of the conveyor 42/42A. The sprocket 156 is furthermore linked by a chain 161 to a sprocket 162 which is freely rotatable about a stub shaft secured to one of the plates 15. The sprocket 162 is integral with a gearwheel whose teeth engage a gearwheel 163 which is freely rotatable about one of the stub shafts 27 (FIG. 3). The gearwheel 163 is integral with a sprocket which is linked by a chain 164 to a sprocket 165 secured to one end of the shaft 25 of the crushing roller 24. Finally, the chain sprocket 156 is linked by means of a chain 166 to a double chain sprocket 167 which is freely rotatable about one of the stub shafts 16 (FIG. 3). The sprocket 167 is linked by a chain 168 to a sprocket 169, secured to the shaft of the drum 19.

In order to move the drier in operation, it can be attached, by means of the drawbar 3, to a tractor or a similar vehicle (not shown). For driving the various parts, the auxiliary shaft 125 can be coupled with the power takeoff shaft of the tractor as already mentioned. Current required for the motor 117 and the temperature measuring elements may also be derived form the tractor. The meter box 106 may be fixed in the position shown in full lines in the FIGS., so that the box is located near the tractor driver, who controls the operation of the drier and who has a satisfactory view of the instruments 107. When the supporting member 104 is turned, for example to the dotted line position shown in FIG. 5, the coupling rod 108 turns the meter box 106 so that also in other positions of the supporting member 104 the tractor driver can readily view the instruments 107.

During movement of the drier in the direction of the arrow A crop lying on the ground is picked up by the drum 19 and is pushed along the scrapers 20 upwards between the crushing rollers 22, 24, where it is crushed. The cells of the plants are thus broken up so that the fluid gets out of the herbs, which accelerates the drying process.

Then the crop is pushed upwards between the two conveyors 33/34 and 42/42A. The air displaced by the impellers 44 is mixed with the hot air from the burners in the outlet spouts 48, after which it flows upwards along the wall 9, In accordance with the position of the guide blades 54 the whole quantity of the air flows upwards between the wall 9 and the blades 54, or part of the air flows between the guide blades 54 and along the crop moving between the conveyors and held by the conveyors. The hot air can thus be directed straight to the crop, which cannot be pushed away by the airstream.

The crop falling from between the upper ends of the conveyors comes into contact with the foremost ejecting member 85 of the upper row of ejecting members and is thrown upwards by this ejecting member. The crop thus elevated is carried along by the airstream and displaced to the rear. The humid and thus fairly heavy crop tends to fall back, but it is again thrown up by the ejecting members of the upper row located behind the foremost member. After its passage along the rearmost ejecting member of the upper row, the crop drops down and passes into the region of the central row of ejecting members, by means of which the crop is displaced to the front, carried along by the airstream, which is guided by the plates 70, 71, 72, 73, 79, 57, and 58. At the front of the drier the crop falls down along the plate 55 and 56, and passes to the lowermost row of ejecting members. By means of this row of ejecting members and of the airstream the crop is again displaced to the rear, where it finally falls out of the superstructure of the wagon through the opening below the rear wall 12.

The rigid tines of the ejecting members have a pinching effect on the crop, which can have a favorable influence on the drying process. The air is compelled to pass several times in opposite senses through the superstructure so that it is in contact with the crop over a long path. The ejection of the crop is favorably affected by the airstream produced by the blades 92, which are fastened to the drums of the ejecting members 85. The rings 96 serve for preventing crop from winding around the ends of the drums and the stub shafts 87. The drier is thus particularly suitable for working long-stemmed crop.

It will be appreciated that fairly dry crop will be carried along by the air more rapidly than crop of higher humidity and hence of heavier weight. The speed with which the crop is moved through the drier may be affected by adjusting the direction of rotation of the ejecting members 85. It will be appreciated that, when the ejecting members rotate in the direction of the arrows B in the upper and lower rows and in the direction of the arrow C in the central row, the ejecting members throw up the crop in the direction corresponding with the direction of flow of the air passing through the superstructure. When the ejecting members are driven in the directions opposite those indicated by the arrows B and C, the crop is thrown up against the direction of flow of the air, so that the crop is moved more slowly through the drier, while at the same time the turbulence of the air is increased, the drying process being thus intensified. The direction of displacement of the crop and hence the movement of the crop with respect to the airstream may furthermore be varied by adjusting the position of the various blades 63, 82, and 76. Moreover, a variation of the position of the tine supports 90 affects the displacement of the crop. This is particularly important with a variety of crop or with processing crop of different degrees of humidity or with both.

The tractor driver, who controls the drier in addition to driving the tractor, can check the drying process by means of the temperature measuring instruments 107. If at a particular area in the drier the temperature rises excessively, he can adjust various control members, e.g. the blades 63, 82, 76 and 98, so that the crop passes more quickly through the drying system. If the temperature becomes too low, he can slow down the rate of passage of the crop through the drying system.

The position of the guide blades 63 is adjusted automatically. If the temperature at the area of the bimetallic plate 118 becomes too low, the plate becomes curved to an extent such that the contact 119 comes into contact with the contact 120 so that the switch 122 is closed and the motor 117 receives current. By means of the motor 117 the guide blades 63 are then rotated to a position such that the crop thrown up by the ejecting members of the lowermost row rises against the direction of flow of the air whereby the crop passes more slowly through this part of the drier. If the temperature becomes too high, the plate 118 becomes curved, in the opposite sense, to an extent such that the contacts 119 and 121 touch, the switch 123 is closed, and the motor 117 is rotated in the opposite sense so that the blades 63 are adjusted to a position in which they guide the crop in a direction which corresponds with the direction of flow of the air. The switches 122, 123 are arranged so that when the blades 63 attain either end position the motor 117 is automatically switched off.

Also by varying the speed of rotation of the ejecting members the drying process may be varied. The blades 76 and 82 can be adjusted from the tractor driver's seat by means of the levers 103. It will be apparent that alternatively the position of these blades 76 and 82 may be controlled automatically in the same manner as described above for the blades 63, since, if desired, all the blades may be coupled with each other.

In place of automatic operation the position of the blades 63 may be adjusted with the aid of a control member (not shown) provided on the drawbar 3. It is furthermore possible to couple the guide blades 98 and for the guide blades 54 with each other, which blades may, as is described for the guide blades 63 by adjusted automatically by means of control members provided on the drawbar 3.

The drying process may furthermore be varied by varying the fuel supply to the burners per unit time or by switching off one or more burners. The relevant control members are preferably also arranged near the front of the drawbar 3. The disposition of the control members at the front end of the drawbar has the advantage that from his seat the tractor driver can readily check the whole drying process and can perform rapidly any variations of the positions and operations of the various members controlled by these control members.

A further possibility resides in a variation of the speed of rotation of the impellers 44 or in closing to a greater or lesser extent the inlet openings of these impellers by mechanisms not shown in the FIGS., or in both. All these control effects may be performed with the aid of manually adjustable control members or with the aid of members responding automatically to temperature variations.

Owing to the various possibilities of adjustment and easy checking of the drying process an optimum effect of the system is ensured.

If desired, only cold air may be blown through the drier. By providing more burners and fans across the width of the drier a uniform distribution of air throughout the width of the drier may be obtained.

Since the burners are arranged so that the flames extend obliquely upwards in the combustion chambers, the superstructure of the wagon may have an advantageous shape in spite of the fairly great length of the combustion chambers.

For transporting or storing purposes the meter box 106 can be moved into the position shown by broken lines in FIG. 5, in which the beam 104 with the meter box does not form a troublesome projection. Moreover, the pickup member 17 can be lifted by means of a lift (not shown).

The drier described has a plurality of conveyors, although only one can be provided if so desired, by means of which the crop is pushed into the superstructure and a plurality of ventilators near the conveyors although again any only one such ventilator can be provided for blowing air along or across the crop displaced by the conveyors. The air can thus flow effectively along or through the crop or both.

Figure 11:
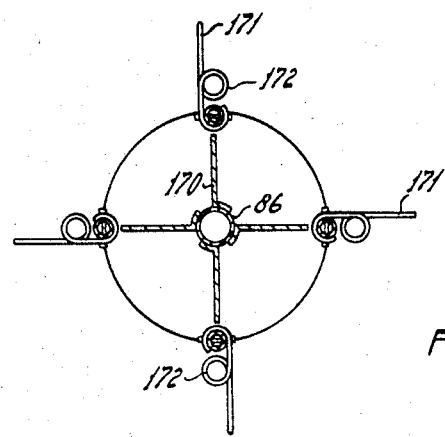
FIG. 11 is a view somewhat similar to FIG. 9 but showing a second form of ejecting member.

In the form of ejecting member shown in FIG. 11 the central beam 86 is provided with four blades 170, extending throughout the length of the beam and having the same function as the blades 92. Each tine support is provided with spring-steel tines 171 and, between the points of fastening of the tines to the support and the free ends of the tines, a few coils 172 are provided. When spring-steel tines are used, i.e. the tines arranged in a resilient manner, the crop is crushed less drastically than with the use of rigid tines.

Figure 12:
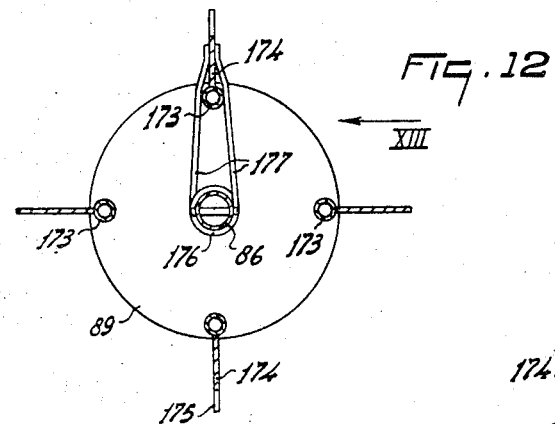
FIG. 12 is a view similar to FIG. 11 but showing a third form of ejecting member.
Figure 13:
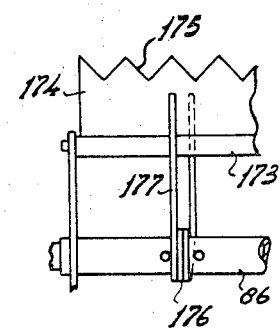
FIG. 13 is a fragmentary view, taken in the direction of the arrow XIII of FIG. 12, of the ejecting member of FIG. 12.

In the form of the ejecting member shown diagrammatically in FIGS. 12 and 13, supports 173 are freely rotatable in the plates 89. Plates 174 are secured to each support 173 so as to extend throughout the length thereof in a radial direction relative to the centerline of the support 173. At the edge 175 remote from the supports 173 each plate 174 is serrated. The central beam 86 is surrounded by a few spring-steel coils 176 which are integral with two arms 177 interconnected by the coils and having their ends located on either side of their associated plate 174. Each plate 174 has two functions. It ensures the lifting of the crop and guides the airstream. And each plate 174 is capable of deflecting resiliently about the centerline of the associated beam 173.

Figure 14:
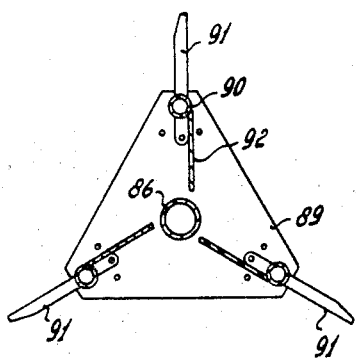
FIG. 14 is a similar view to FIGS. 11 and 12 but showing a fourth form of ejecting member.
Figure 15:
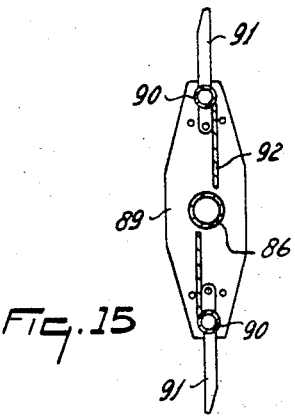
FIG. 15 is a view similar to FIGS. 11, 12 and 14 but showing a fifth form of ejecting member.

In the forms of ejecting member shown in FIGS. 14 and 15 three and two tine supports 90 respectively are employed instead of four tine supports. The construction thereof corresponds otherwise with that of the tine support of the form shown in FIGS. 8 and 9. When the constructions shown in FIGS. 14 and 15 are employed, the ejecting members have a smaller weight and are cheaper to construct, since a smaller number of tine supports is used, and the supports 89 for the tine supports 90 may also be of lighter weight. A further advantage of this construction is that the airstream produced by the blades 92 of the ejecting members exhibits greater turbulence, which may have a favorable effect on the drying process. The tines used in the various embodiments may, if desired, be made of a synthetic resin or of rubber. Instead of, or in conjunction with, the pickup device, a mowing device may be attached to the front of the drier, so that the crop can be simultaneously mown and dried.

Figure 16:
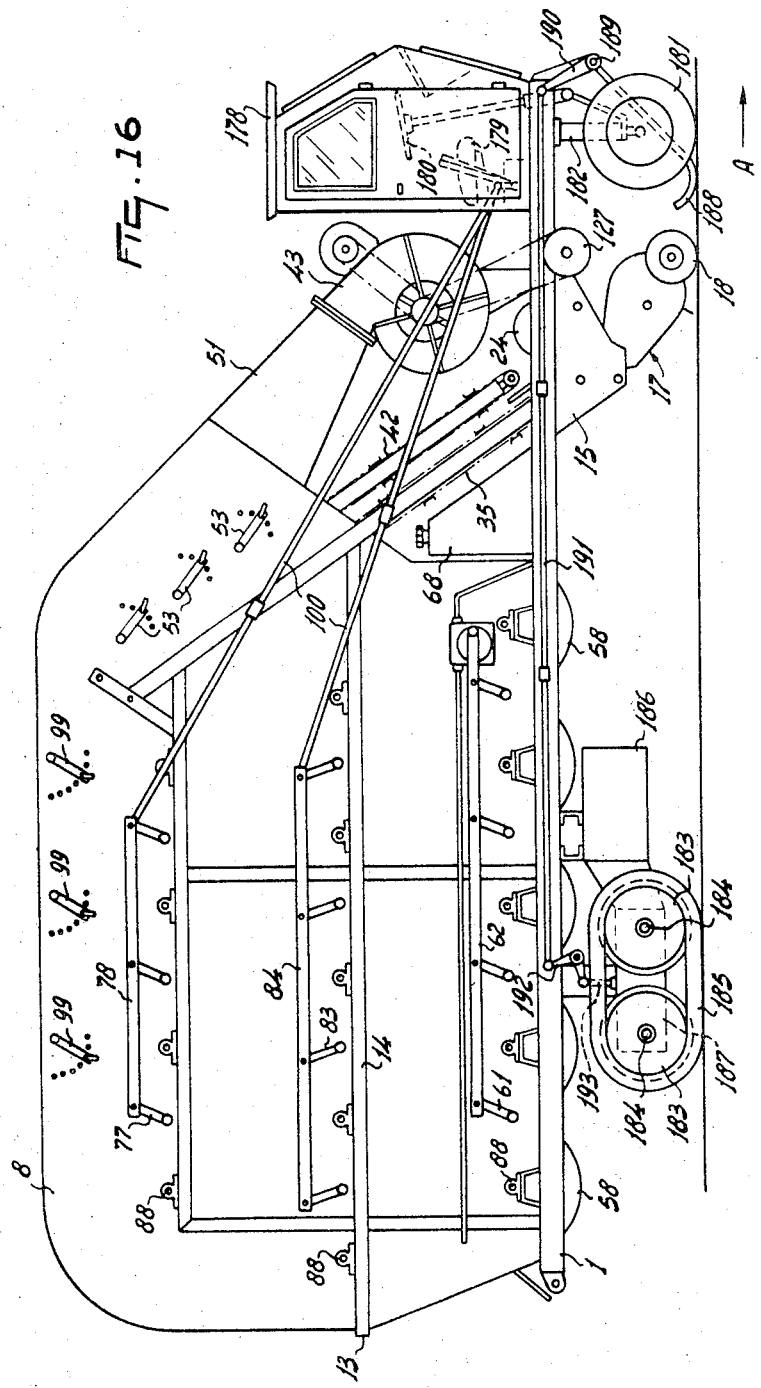
FIG. 16 is a side view, similar to FIG. 2, of a self-propelled transportable crop drier.

The drier shown in FIG. 16 corresponds largely with the form already described and corresponding parts are designated by the same reference numerals. This drier is, however, self-propelled and has a cabin 178 with a seat 179 for the driver who controls the drier. In the cabin 178 there is a steering wheel 180 by means of which steerable wheels 181 at the front of the drier can be controlled. These wheels ares secured to a portal shaft 182 so that a swath of crop can pass between the wheels without coming into contact with the front axle of the drier. The rear wall of the cabin protects the driver from heat radiation from the burner.

The drier is supported near the back from four ground wheels 183 which are mounted on two axles 184 disposed one behind the other. Each pair of wheels 183 disposed one behind the other on either side of the drier is intercoupled by a rubber endless member 185 so that a low surface pressure is ensured. Drive is transmitted from an engine 186 beneath the superstructure of the drier through a transmission gear 187. This transmission gear is preferably continuously adjustable so that the speed of travel of the drier can be readily varied. For this purpose an axial plunger pump and an axial plunger motor may be employed.

In the form shown the front of the drier is provided with a plurality of adjacent, interconnected arms 188, which are pivoted to a frame of the drier by means of a pivotal shaft 189 extending transversely of the intended direction of operative travel. The shaft 189 is provided with an arm 190 which is coupled by means of a coupling rod 191 with a bellcrank lever 192 which is pivoted to the frame in the vicinity of the transmission gear. The bellcrank lever 192 is coupled with the transmission gear by means of a coupling rod 193. When, in operation the drier is propelled, the arms 188 glide over the crop. If the thickness of the swath to be picked up increases, the arms 188 are urged upwards so that the bellcrank lever 192 is turned. The bellcrank lever 192 is coupled with the transmission gear in a manner such that turning of the lever 192 brought about by an increase in swath thickness adjusts the transmission gear to reduce the speed of travel of the drier. When the lever 192 turns in the reverse direction, i.e. when the swath to be picked up reduces in thickness, the transmission ratio of the transmission gear is varied so that the drier gains speed. The speed of the wagon thus matches automatically the quantity of crop to be picked up.

The crop passed through the drier and distributed on the field may, if desired, be passed again through the drier. Then it may be collected and transported to a store by means of the drier itself or with the aid of a further wagon. An advantageous combination may be obtained by attaching a low-pressure baler or a wafer press to the rear of the drier.

If, for example, a low-pressure baler is attached to either of the forms of drier described, the crop falling out of the drier may be compressed to bales, which may be collected and transported to a store. The use of a low-pressure baler is particularly advantageous since the warm crop is still allowed to exhale to some extent, which will not occur as readily when the crop is compressed by means of a high-pressure baler.

Figure 17:
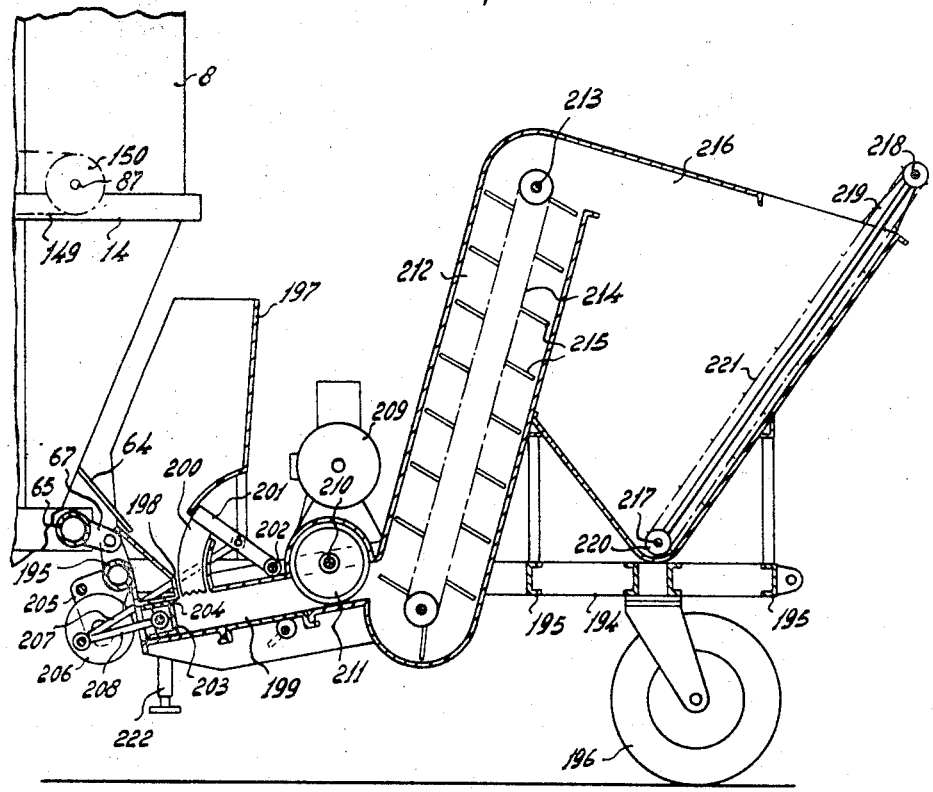
FIG. 17 is a cross-sectional side view, taken from the same viewpoint as FIG. 1 of a cake press that can be attached to the rear of either of the driers of FIGS. 1 to 16.

A form of a wafer press, which may be used in conjunction with either of the driers described above, is shown diagrammatically in FIG. 17. The wafer press has a frame that includes two longitudinal frame beams 194 which are interconnected by transverse beams 195. The frame is supported from caster ground wheels 196. At the front of the press a collecting trough 197 is provided. The lower end 198 of the collecting trough forms a supply channel for a compression chamber 199. The supply channel 198 accommodates a reciprocatory pressing member 200. The pressing member 200, the width of which is equal to the width of the compression chamber 199, is secured to two arms 201, which are pivoted to the frame by means of stub shafts 202. A piston 203 is able to reciprocate in the compression chamber 199 and is provided on its upper side with a knife 204. The width of the pressing member 200 and of the piston 203 is preferably equal to or larger than the width of a conventional swath and at least five times the height of the compression chamber.

The foremost transverse beam 195 is provided with downwardly projecting supports 205 with which discs 206 are coupled so as to be rotatable about horizontal stub shafts extending transversely of the direction of operative travel of the wafer press. The discs 206 are coupled by means of connecting rods 207 and 208 with the arms 201 and the piston 203. The discs 206 can be driven by a motor 209, mounted on the frame, so that in operation the pressing member 200 and the piston 203 performs a reciprocatory movement.

Near one end of the compression chamber 199 a plurality of circular knives 211 are provided on a shaft 210 extending transversely of the direction of length of the press. The shaft 210 may also be driven by the motor 209. The compression chamber 199 opens out in an elevator channel 212, to the sidewalls of which bearings are secured that accommodate shafts 213 lying one above the other. Endless chains 214 passed around the shafts 213 provided with catches 215. The elevator channel 212 is integral with a container 216 mounted on the frame and having a V-shaped configuration in sectional side view. Near the base of the container 216 a shaft 217 is journaled in bearings secured to the sidewalls of the container 216. A shaft 218, extending parallel to the shaft 217, is journaled in bearings secured to arms 219 extending above the sidewalls of the container 216. The two shafts 217, 218 are provided with chain sprockets 220 around which are passed endless chains 221 provided with catches. At the front of the frame a vertically adjustable supporting member 222 is provided for supporting the front end of the wafer press when it is detached from a towing vehicle.

In operation the crop leaving the drier to which the wafer press is attached is collected in the trough 197 from where it is urged by the pressing member 200, which moves along the arc of a circle while reciprocating into the compression chamber 199. By means of the reciprocatory piston 203 the crop is pushed across the compression chamber 199 to the rear. The knife 204, secured to the piston 203, cuts the crop located in the compression chamber 199 from the crop located in the collecting trough 197.

During the passage of the crop through the compression chamber 199 the crop is sliced by the knives 211, which slices are loosened from one another automatically, when falling into the elevator channel 213, so that loose wafers are conveyed upwards by the catches 215 of the conveyor 214 and fall into the container 216. When the container 216 is full, it may be emptied by means of the conveyor formed by the endless chain 221. A combination of either of the driers described and the wafer press is particularly effective, since the heated crop is in suitable condition for being compressed into wafers.

Having thus described my invention, what I claim as new and desire to secure by letters patent of the United States is:

I claim:

1. A crop drier for drying cut crop which comprises:
a frame;
a drying enclosure carried by said frame;
said enclosure including an inlet for cut crop and an outlet for dried crop;
a path within said enclosure leading from said inlet to said outlet;
ventilator means supported by said frame displacing air through said path from said inlet to said outlet;
a plurality of ejecting members within said housing disposed along said path and adapted to throw cut crop upwardly at an angle to the movement of said air moving through said path, said ejector members adapted to rotate in a first direction; and
means for reversing said first direction of rotation to a second opposite direction of rotation.

2. A mobile crop drier for drying cut crop which comprises:
an enclosed superstructure wherein the crop is dried;
a burner arranged near the front of the superstructure with respect to its intended direction of travel, said burner disposed so that a flame discharged therefrom extends obliquely upwardly;
ventilator means and an outlet spout therefor leading into the drying space of said superstructure;
a combustion chamber for said burner, air displaced by said ventilator means being guided in said outlet spout along said combustion chamber; and
a conveyor for cut crop situated in said superstructure behind said outlet spout whereby gases are displaced from said ventilator means in the direction of said conveyor.

3. A mobile crop drier in accordance with claim 2 wherein guide blades are interposed between said combustion chamber and said conveyor, said guide blades being adjustable to a plurality of positions to control the amount of air passing from said ventilator means to said conveyor.

4. A mobile crop drier for drying cut crop which comprises:
an enclosed superstructure wherein the crop is dried;
a burner arranged near the front of the superstructure with respect to its intended direction of travel, said burner disposed so that a flame discharged therefrom extends obliquely upwardly; and
a pair of belt members disposed in the forward portion of said superstructure behind said burner for conveying cut crop between them to the upper portion of said superstructure, one of said belt members being pivotally mounted in said superstructure whereby the distance between said belt member is variable to match the quantity of crop passing therethrough.

5. A mobile crop drier for drying cut crop which comprises:
an enclosed superstructure wherein the crop is dried;
a burner arranged near the front of the superstructure with respect to its intended direction of travel, said burner disposed so that a flame discharged therefrom extends obliquely upwardly;
ventilator means cooperating with said burner whereby heated air is directed obliquely upwardly into said superstructure to the rear with respect to the intended direction of travel of the drier;
an obliquely disposed conveyor means mounted in said superstructure behind said ventilator means; and
a further space in said superstructure accommodating further members for conveying crop located behind said conveyor means.

6. A mobile crop drier in accordance with claim 5 where there are at least three ventilator means and at least two burners arranged near the front of said superstructure, said burners being located between said ventilator means.

7. A mobile crop drier in accordance with claim 5 which includes crushing means interconnected to said superstructure adjacent the lower aspect of said conveyor means whereby the crop received by said conveyor means is first crushed.

8. A mobile crop drier in accordance with claim 7 which includes a pickup device interconnected to said superstructure adjacent the inlet of said crushing means adapted to convey cut crop from the ground to said crushing means.

9. A mobile crop drier in accordance with claim 1 which includes a burner cooperating with said ventilator means, a pari of belt members disposed in the forward portion of said enclosure behind said burner for conveying said cut crop between them to the upper portion of said enclosure, one of said belt members being pivotally mounted in said enclosure whereby the distance between said belt member is variable to match the quantity of crop passing therethrough.

10. A mobile crop drier in accordance with claim 1 which includes a burner cooperating with said ventilator means whereby heated air is directed obliquely upwardly into said enclosure to the rear with respect to the intended direction of travel of the drier, an obliquely disposed conveyor means mounted in said enclosure behind said ventilator means; and a further space in said enclosure accommodating further members for conveying crop located behind said conveyor means.

11. A mobile crop drier in accordance with claim 10 where there are at least three ventilator means and at least two burners arranged near the front of said enclosure, said burners being located between said ventilator means.

12. A mobile crop drier in accordance with claim 10 which includes crushing means interconnected to said frame adjacent the lower aspect of said conveyor means whereby the crop received by said conveyor means is first crushed.

13. A mobile crop drier in accordance with claim 12 which includes a pickup device interconnected to said frame adjacent the inlet of said crushing meaNs adapted to convey cut crop from the ground to said crushing means.

14. A mobile crop drier for drying cut crop which comprises an enclosed superstructure wherein the crop is dried, and a burner arranged near the front of the superstructure with respect to its intended direction of travel, said burner disposed so that a flame discharged therefrom extends obliquely upwardly, said superstructure including ventilator means and an outlet spout therefor leading into the drying space of said superstructure, said burner disposed adjacent said outlet spout, a combustion chamber for said burner, air displaced by said ventilator means being guided in said outlet spout along said combustion chamber, a conveyor being provided for cut crop situated in said superstructure behind said outlet spout whereby gases are displaced from said ventilator means in the direction of said conveyor.

15. A mobile crop drier in accordance with claim 14 wherein guide blades are interposed between said combusting chamber and said conveyor, said guide blades being adjustable to a plurality of positions to control the amount of air passing from said ventilator means to said conveyor.